United States Patent
Husemann et al.

(10) Patent No.: US 6,939,588 B2
(45) Date of Patent: Sep. 6, 2005

(54) CROSS LINKAGE OF PRESSURE-SENSITIVE ADHESIVE SUBSTANCES BY MEANS OF ELECTRON BEAMS

(75) Inventors: Marc Husemann, Hamburg (DE); Bernd Dietz, Ammersbek (DE); Werner Karmann, Hamburg (DE); Maren Klose, Seevetal (DE); Hermann Neuhaus-Steinmetz, Ahrensburg (DE)

(73) Assignee: tesa Aktiengesellschaft, Hamburg (DE)

( * ) Notice: Subject to any disclaimer, the term of this patent is extended or adjusted under 35 U.S.C. 154(b) by 177 days.

(21) Appl. No.: 10/220,582
(22) PCT Filed: Mar. 13, 2001
(86) PCT No.: PCT/EP01/02792
§ 371 (c)(1), (2), (4) Date: Sep. 3, 2002
(87) PCT Pub. No.: WO01/70894
PCT Pub. Date: Sep. 27, 2001

(65) Prior Publication Data
US 2003/0034123 A1 Feb. 20, 2003

(30) Foreign Application Priority Data
Mar. 23, 2000 (DE) .......................... 100 14 563

(51) Int. Cl.⁷ .............................. B05D 3/06; C09J 7/02
(52) U.S. Cl. ...................... 427/551; 427/553; 427/558; 427/596; 427/208.4; 156/275.5; 156/275.7
(58) Field of Search ................................. 427/553, 558, 427/428.01, 428.2, 532, 551, 595, 596, 208.4, 331, 211, 359, 428; 156/272.2, 274.4, 274.6, 275.5, 278; 428/343, 345

(56) References Cited

U.S. PATENT DOCUMENTS

| | | | | |
|---|---|---|---|---|
| 4,427,732 A | * | 1/1984 | Gray et al. ................. | 428/172 |
| 5,468,542 A | * | 11/1995 | Crouch ........................ | 428/215 |
| 6,455,152 B1 | * | 9/2002 | DiZio et al. ................. | 428/345 |
| 6,472,025 B1 | * | 10/2002 | Guldbrandsen et al. ..... | 427/487 |

FOREIGN PATENT DOCUMENTS

| | | | | |
|---|---|---|---|---|
| DE | 198 46 902 A1 | 5/2000 | .............. | C09J/7/02 |
| EP | 0 453 254 A2 | 10/1991 | .............. | C09J/7/02 |
| WO | WO 00/47684 | 8/2000 | .............. | C09J/7/00 |

* cited by examiner

Primary Examiner—John T. Haran
(74) Attorney, Agent, or Firm—Norris McLaughlin & Marcus PA

(57) ABSTRACT

A process for crosslinking a coating of pressure-sensitive adhesive systems on a backing material, characterized in that
the pressure-sensitive adhesive system present on the backing material is irradiated with accelerated electrons by means of an irradiation means,
the backing material coated with the pressure-sensitive adhesive system to be irradiated runs via a roller,
there is a contact medium between the roller and the backing material during irradiation.

19 Claims, 1 Drawing Sheet

CROSS LINKAGE OF PRESSURE-SENSITIVE ADHESIVE SUBSTANCES BY MEANS OF ELECTRON BEAMS

This application is a 371 of PCT/EPOI/02792, which was filed on March 13, 2001.

The invention relates to a process for the electron beam crosslinking of pressure-sensitive adhesive tapes while avoiding damage to the release layer on the reverse.

The service properties of adhesive tapes are determined quite essentially by the properties of the pressure-sensitive adhesive (PSA). Its adhesive is composed of at least one high molecular mass elastomer plus where appropriate one or more tack-defining resins and also further additions for modifying the properties, improving the stability, etc. For further information on the composition, preparation, and properties of adhesive tapes, refer to the article "Tapes, Adhesive" in Ullmann's Encyclopedia of Industrial Chemistry, Sixth Edition, 2000 Electronic Release, Wiley-VCH, Weinheim 2000.

To produce the adhesive tapes, the adhesives are applied in one or more thin films to suitable backing or carrier materials such as films, papers, nonwovens, wovens, etc. For this purpose they must be converted into a fluid state of appropriate viscosity, which can be done by dissolving them in solvents, dispersing them in liquids or, in the case of those known as hotmelts, by melting them at elevated temperatures. These coatings are subsequently solidified by evaporating the solvent or dispersion medium or by cooling the hotmelts to give the pressure-sensitive adhesive. The hotmelts in particular, but also the other pressure-sensitive adhesives, lose their strength again by heating, thereby limiting the scope of use.

This can be prevented by crosslinking, thereby expanding the scope for use of the adhesive tapes thus produced. Crosslinking comprehends all reactions which lead to a chemical bond between the polymer chains of the elastomer. This can be achieved by means of chemically initiated or radiation-chemically initiated reactions. The latter may in turn be initiated by UV radiation or by high-energy radiation such as accelerated electrons (EBC). Preference is given to employing radiation crosslinking (UV and EBC technology), since these reactions take place very quickly and do not require thermally labile groups. A further process for preparing pressure-sensitive adhesives starts from reactive liquid monomers and oligomers, which are cured by a radiation to form a cohesive pressure-sensitive adhesive. An overview has been given by Karmann and Zöllner in "Radiation Curing of PSA—An Overview", RadTech Europe, Maastricht 1995. Since there are no fundamental differences between the above-described crosslinking and curing, both are referred to below as "crosslinking".

The UV technology is relatively inexpensive in terms of apparatus. Owing to the photoinitiators required and the absorption of light by the adhesives, however, crosslinking cannot be carried out unrestrictedly. For example, transparent acrylic PSA tapes can be crosslinked efficiently up to a maximum of about 100 $g/m^2$. In the case of adhesives comprising resins or fillers, the limits are much lower. For natural-rubber adhesives, UV crosslinking is even less favorable.

The EBC technology is significantly better suited to this purpose. Fortunately, a majority of the polymers used for PSAs such as the polyacrylates, natural rubber and other polydiene rubbers, ethylene-vinyl acetate, polydimethylsiloxanes, are polymers which crosslink predominantly under the influence of electron beams (see, for example, J. E. Wilson, "Radiation Chemistry of Monomers, Polymers, and Plastics" Marcel Dekker, Inc., New York, 1974). Given a sufficiently high electron accelerating voltage, even PSAs with film thicknesses more than several 100 $g/m^2$ are penetrated almost completely, and crosslinked, irrespective of their composition. Further advantages here are the rapidity of these processes, the minimal requirements imposed on the structure and composition of the components to be crosslinked (UV-active groups need not be present), and the ability to regulate the operation precisely.

Nevertheless, this technology too has disadvantages. In order to achieve uniform crosslinking of the adhesive, the adhesive tape must be transirradiated with sufficient uniformity, so that even the backing films are subjected to more or less high radiation doses. In this process, some polymers become degraded, and so become brittle and lose mechanical load-bearing properties. Other polymers undergo discoloration during and after irradiation. Particularly serious damage occurs to release layers, which are frequently present on the reverse of the backing films in order to obtain a desired adjustment of the unwind force after the tape has been wound up: following exposure to radiation, they lose activity, as a result of which the unwind forces of the adhesive tapes rise unacceptably. This applies in particular to silicone layers following storage at elevated temperatures.

This damage can be reduced if the adhesive tape runs with its reverse over a thermal conditioning plate under the electron accelerator or is on a metallic thermal conditioning roller, both of which act as radiation traps. Nevertheless, the effect is inadequate at radiation doses above about 10 kGy.

Patent application DE 198 46 902 A1 describes how, by choosing the accelerating voltage, it is possible to keep the radiation dose absorbed by the release layer on the reverse of a release liner low and to crosslink the adhesive film with a substantially higher radiation dose. In the case of unfavorable thickness ratios between the adhesive film and the backing, however, the possibilities are limited.

It is an object of the invention, therefore, to provide a process for electron beam crosslinking of pressure-sensitive adhesives which makes it possible to prevent or at least very substantially reduce the damage for the reverse of the release layers without having to restrict the radiation dose needed for the crosslinking of the adhesive film, and to do so even when the thickness proportions between adhesive layer and backing are unfavorable.

Surprisingly, and unforeseeable for the skilled worker, it has been found that an advantageous procedure of this kind is possible by introducing a suitable contact medium between the reverse of the adhesive tape and the roller, especially a thermal conditioning roller, during the irradiation process.

The invention accordingly provides a process for electron beam crosslinking of a coating of pressure-sensitive adhesives on a backing material, characterized in that the pressure-sensitive adhesive film located on the backing material is crosslinked by electron beams by means of an irradiation means, the backing material coated with the pressure-sensitive adhesive system to be crosslinked runs over a roller during irradiation, there is a contact medium between the roller and the backing during irradiation.

BRIEF DESCRIPTION OF THE DRAWING

The invention will now be described in greater detail with reference to the drawing, wherein.

Figure 1:
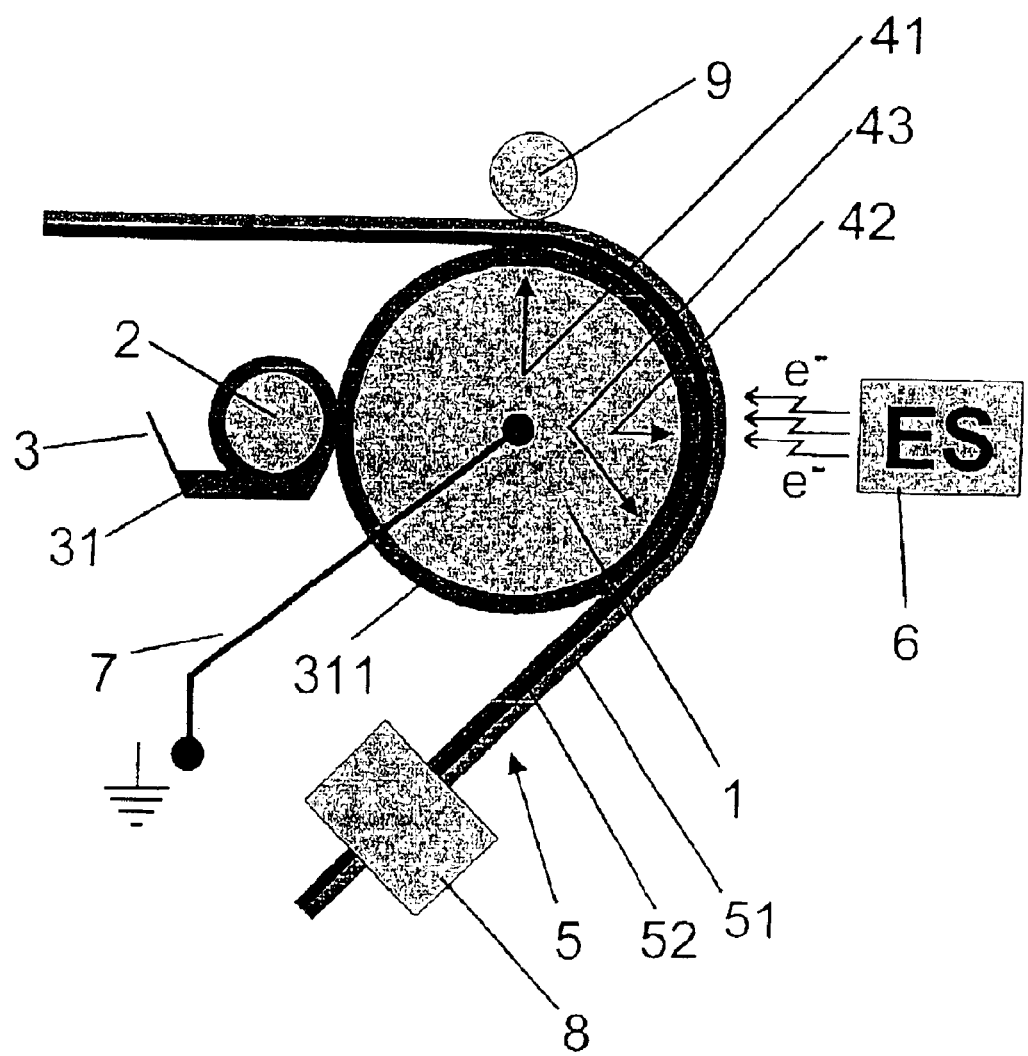
FIG. 1 is a depiction of a setup for carrying out a process embodiment according to the present invention.

The contact medium is preferably removed in whole or in part from the backing material following irradiation.

Contact between the backing material and the roller must be ensured over the entire irradiation area of the backing material provided with the pressure-sensitive adhesive system.

Preferably in accordance with the invention, this process is carried out in a unit composed of an electron accelerator, a roller, preferably a thermal conditioning roller, a fluid applicator, and, if desired, a drying unit.

In a very advantageous procedure, the roller is thermally conditioned. In the text below, in all cases where reference is made only to the roller, the thermal conditioning roller is expressly included as one of the preferred embodiments. The thermal conditioning of the roller is situated preferably within a range from −10° C. to 200° C., with very particular preference from 5° C. to 150° C.

The roller used is commonly an earthed metal roller which absorbs the incident electrons and the x-rays which form in this case. It is preferably equipped with an effective thermal conditioning system in order to ensure dissipation of energy, particularly in the form of heat energy. In order to prevent corrosion it is normally covered with a protective coat. This coat is preferably selected so as to be wetted effectively by the contact medium. In general, the surface is conductive. It may also be more favorable, however, to coat it with one or more coats of insulating or semiconducting material.

Rollers which can be used advantageously for the inventive process are steel rollers, especially those which carry a coating for improving the corrosion resistance and/or wetability, these coatings preferably being of appropriate metals (chromium, for example), metal oxides or ceramic.

In the inventive process the contact medium is applied advantageously either to the reverse of the backing or to the described roller; it is also possible, however, for it to be applied contactlessly, by spray application, for example. During electron beam irradiation, the contact medium is located between the roller and the backing material.

The contact medium of the invention that is used is a material which is capable of producing a contact between the backing material and the roller's surface, particularly a material which fills the cavities between backing material and roller surface (for example, unevennesses in the roller's surface, bubbles).

Appropriate for this purpose are fluid materials which may be present within a wide viscosity range. Accordingly, the contact medium may be composed, for example, of a pressure-sensitive adhesive or of another material which flows onto the backing material and so displaces the air between backing and roller.

Moreover, soft, "conforming" materials may be used as the contact medium. On the one hand, it is possible preferentially to use pliable materials such as, for example, soft rubber, plasticized PVC, other plasticized polymers, and similar materials. If they are are firmly connected to the roller, they must exhibit sufficient radiation resistance and also, preferably, sufficient thermal and electrical conductivity.

It is particularly advantageous in accordance with the invention, especially when using contact media lacking sufficient radiation resistance, not to leave the contact medium permanently on the roller but instead to apply it to the roller before the irradiation operation and to remove it from the roller again after the irradiation operation. The latter principle may be realized, for example, in an excellent way in accordance with the invention by introducing it into the process with the backing material: for example, in the form of a film which runs onto the roller with the backing material. In a further advantageous embodiment, the contact medium is in the form of a replaceable covering on the roller. The contact medium may be replaced during the irradiation operation (continuous replacement) or between the individual irradiation operations (discontinuous replacement). The continual replacements prevent it being so severely impaired by the ongoing irradiation that it loses its function.

In particular in the case of sufficient radiation resistance or sufficiently low radiation load, however, it may likewise be advantageous, for corresponding variants of the inventive process, for the contact medium to remain permanently on the roller.

It has been found very advantageous in accordance with the invention to use as the contact medium a liquid which where appropriate comprises additives for additional functions. These include the increasing of wetting and of electrical conductivity and the scavenging of free radicals and other reactive species generated by the absorbed radiation.

As a contact liquid it is possible with advantage to use water, which satisfies the required objectives of the invention.

In a further variant, which is outstandingly suitable in the sense of the invention, the contact medium is admixed with substances which are at least partly soluble therein. For water as a contact medium, examples of additions include alkyl alcohols such as ethanol, propanol, butanol, hexanol, without wishing to be restricted in the selection of alcohols by these examples. Also very advantageous are, in particular, relatively long-chain alcohols, glycols, polyglycols, ketones, amines, carboxylates, sulfonates, water-soluble cellulose derivatives, and the like.

A lowering of the surface tension may also be brought about by the addition of small amounts of nonionic and/or anionic and/or cationic surfactants to the contact medium. In the simplest case, commercial washing compositions or soap solutions can be used for this purpose, preferably in a concentration of several g/l in water as the contact medium. Particularly suitable are specific surfactants which can be used even at a relatively low concentration. Examples are sulfonium surfactants (e.g., β-di(hydroxyalkyl)sulfonium salt), furthermore ethyoxylated nonylphenylsulfonic acid ammonium salts. Here, reference may be made in particular to the state of the art under "surfactants" in Ullmann's Encyclopedia of Industrial Chemistry, Sixth Edition, 2000 Electronic Release, Wiley-VCH, Weinheim 2000.

As contact media, the abovementioned liquids may also be used without the addition of water, in each case individually or in combination with one another.

In order to enhance the properties of the contact media (for example, to increase the shear resistance, reduce the transfer of surfactants or the like to the liner surface, and thus improved cleaning possibilities of the end product) it is further possible with an advantage to add salts, gels, and similar viscosity-raising additives to the contact medium and/or to the adjuvants employed.

In the case of a liquid contact medium, one possible outstanding procedure is to run a second roller (application roller), advantageously having a wettable or absorbent surface, through a bath containing the contact medium, wetting or impregnating it with the contact medium in the process, and, by contact with the first roller, applying or spreading on a film of this contact medium. Other embodiments of the applicator may also be realized.

The term "rollers" is used below for the first roller (roller in accordance with the entry in the main claim, including the thermally conditionable embodiment) and the second roller as application roller. A third roller (contact roller) which is also to be introduced is referred to consequently as the contact roller.

Typical irradiation means which are employed in the inventive embodiment of the process are linear cathode systems, scanner systems, and segmented cathode systems, where electron beam accelerators are concerned. A detailed description of the state of the art and of the most important process parameters can be found in Skelhorne "Electron Beam Processing" in Vol. 1"Chemistry & Technology of UV & EB Formulations for Coatings, Inks & Paints", publ. by Sita Technology, London, 1991.

The accelerating voltages are situated in the range between 40 kV and 500 kV, preferably from 80 kV to 300 kV. The radiation doses employed range between 5 to 150 kGy, in particular from 20 to 100 kGy.

The guided supply of the backings to be irradiated, i.e. the release-coated materials such as papers, films, nonwovens and the like, see later on below, is advantageously performed under a certain contact pressure. This ensures that, on the one hand, no air bubbles are included between the reverse of the backing and the (first) roller and that, secondly, the amount of contact liquid is limited to the necessary measure. The contact pressure can be achieved by setting an appropriate web tension or by applying pressure using a contact roller. In this case, the surface of the contact roller must have a sufficient release effect so that the pressure-sensitive adhesive film on the surface of the backing does not stick to it. Further possibilities include pressure applied by air jet or air cushion or by electrostatic forces.

Contact rollers can be, for example, steel rollers as well, and ceramic rollers are also suitable. Preference for use as contact rollers is given to those which are manufactured from elastic material, especially rubber rollers or silicon rubber rollers, or those which possess an elastic or rubberized surface. The rubber hardness of the contact roller material or of the contact roller surface is preferably from 30 to 100 shore (A), in particular 40–80 shore (A). In accordance with the state of the art, the covering of the contact roller may be composed of EPDM, Viton or Silicon rubber or other elastic materials.

In one advantageous variant of the process, the contact medium is electrically conductive or becomes electrically conductive during and/or after irradiation.

A further development of the process of the invention is distinguished by the fact that the roller and/or the surface of the roller are electrically conductive or semiconducting. This makes it possible to improve additionally the prevention of damage to the backing material.

Where the coating roller is not composed of material which is conductive per se, such as is the case with steel or another metal, for example, an additive which ensures sufficient conductivity may be added to the roller material. This can be achieved by adding carbon black or metal dusts or metal particles or by doping, the conductivity preferably being ensured at least during electron beam irradiation.

Moreover, it is very advantageous for the process of the invention if the contact medium and/or the roller and/or the surface of the roller are grounded.

Moreover, the roller may be microscopically smooth or have a slightly textured surface. It has been found appropriate for it to possess a surface texture, especially a roughening of the surface. This makes it possible to improve wetting by the contact medium.

In an advantageous further development of the inventive process, the contact medium is applied to the roller by means of a fluid applicator. It has also been found very positive for the progression of the process of the invention if the fluid application as well is thermally conditionable.

As being crosslinkable in a particularly advantageous way with this process it is possible to use, as the pressure-sensitive adhesive system, acrylic, natural-rubber, synthetic-rubber, silicon or EVA adhesives; from this group, particular advantage is possessed by the acrylic pressure-sensitive adhesives. Naturally, the process can also be used, however, to process all other radiation-crosslinkable pressure-sensitive adhesives known to the skilled worker, as set out, for example, in the "Handbook of Pressure Sensitive Adhesive Technology" by Donatas Satas (van Nostrand, New York, 1989).

One inventive use of the crosslinked pressure-sensitive adhesive system produced in accordance with one of the preceding claims is, with particular advantage, its use for an adhesive tape, it being possible for the adhesive tape to be provided on one or both sides with a self-adhesive layer.

An adhesive tape of this kind does not lose its advantageous service properties by crosslinking, especially its unwindability.

As acrylic pressure-sensitive adhesives it is possible in particular to use elastomer (Co)polymers having the following composition, without wishing to be unnecessarily restricted by this information:

(A) acrylic and methacrylic acid derivatives of the general formula $CH_2=CH(R_1)(COOR_2)$ with a fraction of 65–100 percent by weight, where $R_1$=H or $CH_3$ and $R_2$=an alkyl chain having 2–20 carbon atoms, (B) vinyl compounds containing functional groups (by way of example, maleic, fumaric and/or itaconic acid, maleic anhydride, styrene, styrene compounds, vinyl esters, especially vinyl acetate, vinyl alcohols, vinyl ethers, acrylamides, etc.), with a fraction of 0–35 percent by weight.

For natural-rubber adhesives, the natural rubber is ground to a molecular weight (weight average) of not below 100 000 daltons, preferably not below 500 000 daltons, and is additived. The electron-beam-crosslinkable synthetic-rubber adhesives can also be employed.

For producing pressure-sensitive adhesive tapes, these elastomers are optionally blended with crosslinkers: suitable crosslinker substances in this context are, in particular, bifunctional or polyfunctional acrylates.

Moreover, for preparing pressure-sensitive adhesives these elastomers are optionally blended with at least one resin.

Tacifying resin for addition which can be used include without exception all known tacifier resins and those described in the literature, provided they exhibit at least partial compatibility with the elastomer. Representatives that may be mentioned include the pinene, indene, and colophony resins, their disproportionate, hydrogenated, polymerized, esterified derivatives and salts, the aliphatic and aromatic hydrocarbon resins, terpene resins and terpene-phenolic resins, and also C5, C9, and other hydrocarbon resins. Any desired combinations of these and further resins may be used in order to set the properties of the resulting adhesive in accordance with what is desired. Express reference may be made to the depiction of the state of the art in the "Handbook of Pressure Sensitive Adhesive Technology" by Donatas Satas (van Nostrand, 1989).

The acrylic PSAs may further be blended with one or more additives such as aging inhibitors, light stabilizers, ozone protectants, fatty acids, resins, plasticizers, blowing agents, nucleators, and accelerators.

They may further have been filled with one or more fillers such as fibers, carbon black, zinc oxide, titanium dioxide, solid microbeads, silica, silicates, and chalk, the addition of blocking-free isocyanates also being possible.

In the case of rubber/synthetic rubber as starting material for the adhesive, further variation possibilities exist, whether the said material is from the group of the natural rubbers or of the synthetic rubbers or whether it comprises any desired blend of natural rubbers and/or synthetic rubbers, it being possible to select the natural rubber or the natural rubbers, in principle, from all available grades, such as, for example, crepe, PSS, ADS, TSR or CV grades, depending on the required purity and viscosity level, and it being possible to select the synthetic rubber or synthetic rubbers from the group consisting of randomly copolymerized styrene-butadiene rubbers (SBR), butadiene rubbers (BR), synthetic polyisoprene (IR), butyl rubbers (IIR), halogenated butyl rubbers (XIIR), acrylate rubbers (ACM), ethylene-vinyl acetate (EVA) copolymers, and polyurethanes and/or blends thereof. Also, preferably, it is possible to add thermoplastic elastomers with a weight fraction of from 10 to 50% by weight to rubbers in order to improve their processing properties, this fraction being based on the overall elastomer fraction. As representatives, mention may be made at this point in particular of the particularly compatible styrene-isoprene-styrene (SIS) and styrene-butadiene-styrene (SBS) types.

As plasticizers which are likewise to be added, it is possible to use all the plasticizing substances which are known from adhesive tape technology. These include, among others, paraffinic and naphthenic oils, (functionalized) oligomers such as oligobutadienes, oligoisoprenes, liquid nitrile rubbers, liquid terpene resins, vegetable and animal oils and fats, phthalates, functionalized acrylates.

The pressure-sensitive adhesives blended in this way are applied directly from solution or as hotmelts to a backing (PP, BOPP, PET, nonwoven, PVC, polyester, polyamide, foam, etc.) or release paper (glassine, HDPE, LDPE, etc.) or are laminated by transfer (backings and release papers are backing materials in the sense of the claims).

For crosslinking, the pressure-sensitive adhesive tape is guided over a roller which is provided with the contact medium. It is preferred to use water, whose effectiveness can be enhanced by adding the additives described above. The film of contact liquid on the roller compensates unevennesses in the roller's surface and carrier and so prevents cavities between the roller and the backing material.

The pressure-sensitive adhesive tape is irradiated with electron beams directly on this roller. The accelerating voltage is chosen so that the electrons pass almost completely through the pressure-sensitive adhesive tape.

Where the liquid film which fills the cavities is present, and where the inventive procedure described is being used, damage to the reverse of the backing material is totally avoided or at least greatly reduced. As a result of the elimination or reduction of damage to the reverse, the unwind properties of the PSA tape are retained or undergo only slight deterioration.

The experimental arrangement for the electron beam curing of the pressure-sensitive adhesive tapes described, i.e., their crosslinking by irradiation with electrons, is depicted in FIG. 1. In the setup chosen in this example and shown in FIG. 1, one of many possible embodiments of the crosslinking unit is shown by way of example, without thereby wishing to undertake any unnecessary restriction.

The thermal conditioning roller 1 is likewise wetted with a film 311 of the contact medium by contact with a second roller 2, which is partly located in a tank 3 containing the contact medium 31. As contact medium 31 it is preferred to use water, to which optionally the abovementioned additives are added. In order to form a stable water film 311, the thermal conditioning roller 1 may possess a textured surface. This surface may be obtained by roughening, similar to the conditions relating to an engraved roller, but even in the case of macroscopically smooth surfaces the microscopic surface roughness brings about sufficient wetting with the contact medium 311.

Position 41, from which the PSA tape (the backing material 52 coated with the PSA 51) is introduced, is variable; in this depiction, the PSA tape is laid onto the roller in the 12 o'clock position (41) and additionally is pressed with a contact roller 9. The irradiation unit 6 is located in the 3 o'clock position (42). The position 42 of the electron-beam source 6 can be varied in accordance with the guiding of the PSA tape, but at least in the irradiation window (42) the PSA tape 5 ought to possess complete contact with the liquid film 311 on the thermal conditioning roller 1. The PSA tape 5 leaves the thermal conditioning roller 1 in the 5 o'clock position (43); this position as well can be located differently in the various embodiments of the unit.

For the purpose of additional conduction of the charge away from it, the thermal conditioning roller 1 may be grounded (7). In addition, the liquid-feeding roller 2 may also be grounded, in order to prevent unnecessary electrical voltages and hence a current flow or creeping currents in the unit.

After it has been irradiated and has left the thermal conditioning roller 1, the adhesive tape 5 passes through a drying unit 8 in order to remove some or all of the contact medium 311 from the backing material 52. Drying here may take place thermally, by exposure to IR radiation and/or radiation of another wavelength range, or mechanically (by stripping off, wiping off, etc.). Also possible is drying in a stream of air, and any other drying method.

In order to document the invention, the series of experiments described below were conducted, without wishing to be unnecessarily restricted through the choice of examples.

Description of the Experiments Carried out

Preparation of the Acrylic PSA

A 200 L reactor conventional for free-radical polymerizations was charged with 2400 g of acrylic acid, 3200 g of N-tert.butylacrylamide, 4000 g of methylacrylate, 30.4 g of 2-ethylhexyl acrylate, and 30 kg of acetone/isopropanol (97:3). After nitrogen gas had been passed through the reactor for 45 minutes with stirring, the reactor was heated to 58° C. and 20 g of 2,2'-azo-isobutronitrile (AIBN) were added. The external heating bath was then heated to 75° C. and the reaction was carried out constantly at this external temperature. After a reaction time of 1 h, a further 20 g of AIBN were added. The reaction was terminated after a time of 48 h, and the product was cooled to room temperature.

Production of the Test Tape

The adhesive was then applied on a standard unit to 23 µm PET film (Mylar® from Du Pont) and dried (the units employed are described in the section on "Production Methods" in "Tapes, Adhesive" in Ullmann's Encyclopedia of Industrial Chemistry, Sixth Edition, 2000 Electronic Release, Wiley-VCH, Weinheim 2000). The application rate was approximately 50 g/m². Before being wound up, the adhesive was lined with siliconized release paper from Lauffenberg. This composite was then cut into strips 1.9 cm wide on a slitting unit and wound into rolls.

Electron Beam Irradiation

Electron beam irradiation was carried out using an instrument from Electron Crosslinking AB, Halmstad, Sweden. The release paper to be irradiated (glassine paper with 1.2 g/m² poly(dimethyl)siloxane from Laufenberg) was guided through underneath the Lenard window of the accelerator on a thermal conditioning roller which is present as standard. In the irradiation zone, the atmospheric oxygen was displaced by flushing with pure nitrogen. The web speed was in each case 10 m/min. For the inventively irradiated material, the thermal conditioning roller was replaced by a special roller with a wettable surface coating and an applicator unit for the contact liquid in accordance with FIG. 1. The release paper was pressed on with a rubberized contact roller (60 shore A), so that air inclusions were prevented. The thickness of the film of liquid was from approximately 0.01 to 0.1 mm. The other process parameters are indicated in the table below.

Measurement of the Release Force

About 1 h after irradiation, strips of the test tape with the adhesive were placed without bubbles onto the side of the irradiated release paper facing the thermal conditioning roller and were pressed on with a 2 kg steel roller. This composite was subsequently stored, either for 1 day at room temperature (about 20° C.) (designation: 1 d RT) or for 7 days at 70° C. (designation: 7 d 70° C.).

To measure the peel force (release force) the side of the test tape was fastened to a steel rail and the release paper bonded to it was peeled off at an angle of 180° and a speed of 300 mm/min. The tensile force required to achieve this (in cN/cm) was measured on a tensile testing machine under standardized conditions (23° C., 50% atmospheric humidity).

Results:

The conditions and the results of the experiments are compiled in the table below.

| Example | Contact liquid | Radiation dose (kGy) | Accelerator voltage (kV) | Release force after | |
|---|---|---|---|---|---|
| | | | | 1 d RT# (cN/cm) | 7 d 70° C. (cN/cm) |
| 1 | | 0 | 0 | 2 | 8 |
| 2a | None | 10 | 200 | 12 | 30 |
| 2b | | 50 | 200 | * | ** |
| 3a | Aqua | 10 | 200 | 8 | 20 |
| 3b | dist. | 50 | 200 | 21 | ** |
| 4a | 5% | 10 | 200 | 3 | 9 |
| 4b | n-butanol | 50 | 200 | 5 | 10 |
| 5a | 5% tert- | 10 | 200 | 4 | 9 |
| 5b | butanol | 50 | 200 | 4 | 12 |
| 6a | 6% | 10 | 200 | 7 | 16 |
| 6b | Alcostop(1) | 50 | 200 | 22 | 23 |

Room temperature (about 23° C.)
* partial splitting of the release paper
** release paper splits
(1)Alcostop ® (VARN Products Company GmbH, Willich); aqueous solution of cellulose gum, anionic surfactants, polypropylene glycol, defoamers, and buffer substances In the case of the unirradiated control sample (Example 1) the release force was very low and even on storage for 7 days for 70° C. did not rise above 8 cN/cm.

In the case of the electron-beam-irradiated samples (example 2a, 2b), on the other hand, a sharp rise in the release force was found. Even with a radiation dose of only 10 kGy (example 2a) it was 12 cN/cm. This effect intensified through storage at 70° C., and after 7 days rose to 30 cN/cm.

Crosslinking with a radiation dose of 10 kGy is in practice, however, too low for many high-performance adhesive tapes; consequently, an experiment with a radiation dose of 50 kGy was conducted in addition (example 2b). Here, the observed effect occurred even more sharply. On unwinding, the release material showed markedly perceptible defects as a result of picking. After storage at 70° C., the release paper split completely, such an adhesive tape would no longer be unwindable.

After the damage to the backing had been demonstrated with the reference samples 2a and 2b, a corresponding series of experiments was conducted with the inventive roller arrangement, using pure water as contact medium. This is done employing the same test tape as in examples 2a and 2b. Within the bounds of measurement accuracy, the radiation doses were situated in the same range, so that the values are directly comparable with one another.

The results can be seen in the table under examples 3a and 3b. At a radiation dose of 10 kGy there was a reduction in the damage to the release paper; however, increasing the radiation dose to 50 kGy led to a marked increase in the release force. After storage at 70° C. for 7 days, there was again splitting of the release paper, which would make such an adhesive tape unusable. A comprehensive improvement was achieved when a small amount of alkyl alcohol such as n-butanol or tert-butanol was added to the water (in each case in a form of 5% addition). The initial values after one day corresponded virtually to the unirradiated release paper, and even after storage at 70° C. only a slight increase in the release forces was found. This behavior was not substantially impaired even by high radiation doses of 50 kGy. The values obtained were within a readily acceptable range for the pressure-sensitive adhesive tapes.

Example 6a, 6b shows that it is also possible to employ commercially customary fountain solutions, such as are customary in the printing industry. Alcostop® from VARN is an aqueous solution comprising cellulose gum, anionic surfactants, polypropylene glycol, defoamers, and buffer substances.

It is possible to find that the inventive process is outstandingly suitable for preventing, or at least maintaining within an acceptable range, the reverse-side damage of backing materials during irradiation with electron beams. The pressure-sensitive adhesive tapes produced and crosslinked in this way are very suitable for industrial use and no longer exhibit the disadvantages of the prior art.

What is claimed is:

1. A process for producing an adhesive tape, said process comprising the following steps:
    a) providing an adhesive tape comprising a backing coated on a first face thereof with a pressure-sensitive adhesive;
    b) crosslinking the pressure-sensitive adhesive by irradiating the adhesive tape while the adhesive tape runs over a roller;
wherein a second face of the backing is between the first face and the roller, and a contact medium is between the roller and the second face.

2. The process of claim 1, wherein the roller is thermally contained.

3. The process according to claim 2, wherein the roller is thermally contained at a temperature in a range from about −10° C. to about 200° C.

4. The process according to claim 3, wherein the roller is thermally contained at a temperature in a range from about 5° C. to about 150° C.

5. The process of claim 1, wherein the contact medium does not remain permanently on the roller but instead is applied to the roller before the irradiating and removed from the roller again after the irradiating.

6. The process of claim 1, wherein the contact medium is introduced into the process with the backing.

7. The process of claim 1, wherein the contact medium is a liquid.

8. The process according to claim 7, wherein the liquid is water.

9. The process according to claim 7, wherein the liquid is water admixed with one or more soluble or partly soluble additives.

10. The process of claim 1, wherein the contact medium comprises one or more additives selected from the group consisting of alkyl alcohols, glycols, ketones, amines, carboxylates, water-soluble cellulose derivatives, sulfonates and surfactants.

11. The process of claim 1, wherein the backing coated with the pressure-sensitive adhesive runs over the roller under applied pressure.

12. The process of claim 1, wherein a surface of the roller is electrically conductive or semiconducting.

13. The process of claim 1, wherein the contact medium and/or the roller and/or a surface of the roller are grounded.

14. The process of claim 1, wherein the roller possesses a surface texture.

15. The process according to claim 14, wherein the surface is roughened.

16. The process of claim 1, wherein the roller is a steel roller.

17. The process according to claim 16, wherein the roller carries a corrosion resistance and/or wettability improving agent.

18. The process of claim 1, wherein the contact medium is applied to the roller by means of a fluid applicator.

19. The process of claim 18, wherein the fluid applicator is thermally conditionable.

* * * * *